No. 707,464. Patented Aug. 19, 1902.
C. S. VAN WAGONER.
LOCKING DEVICE FOR VEHICLE STEERING MECHANISM.
(Application filed Sept. 6, 1901.)
(No Model.) 2 Sheets—Sheet 1.
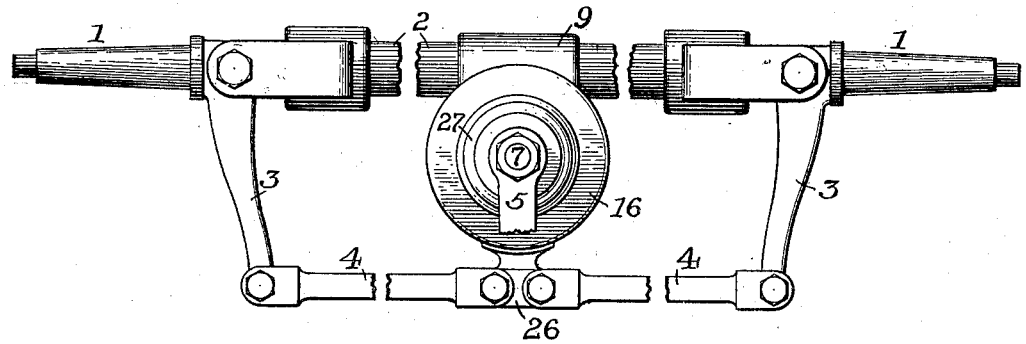
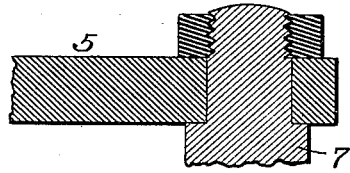
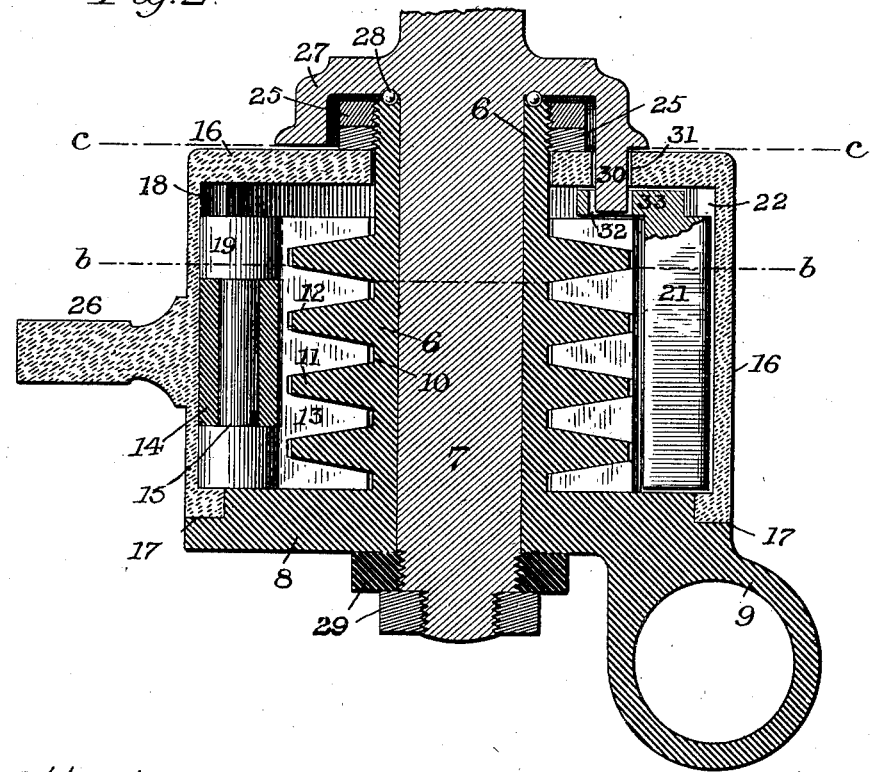

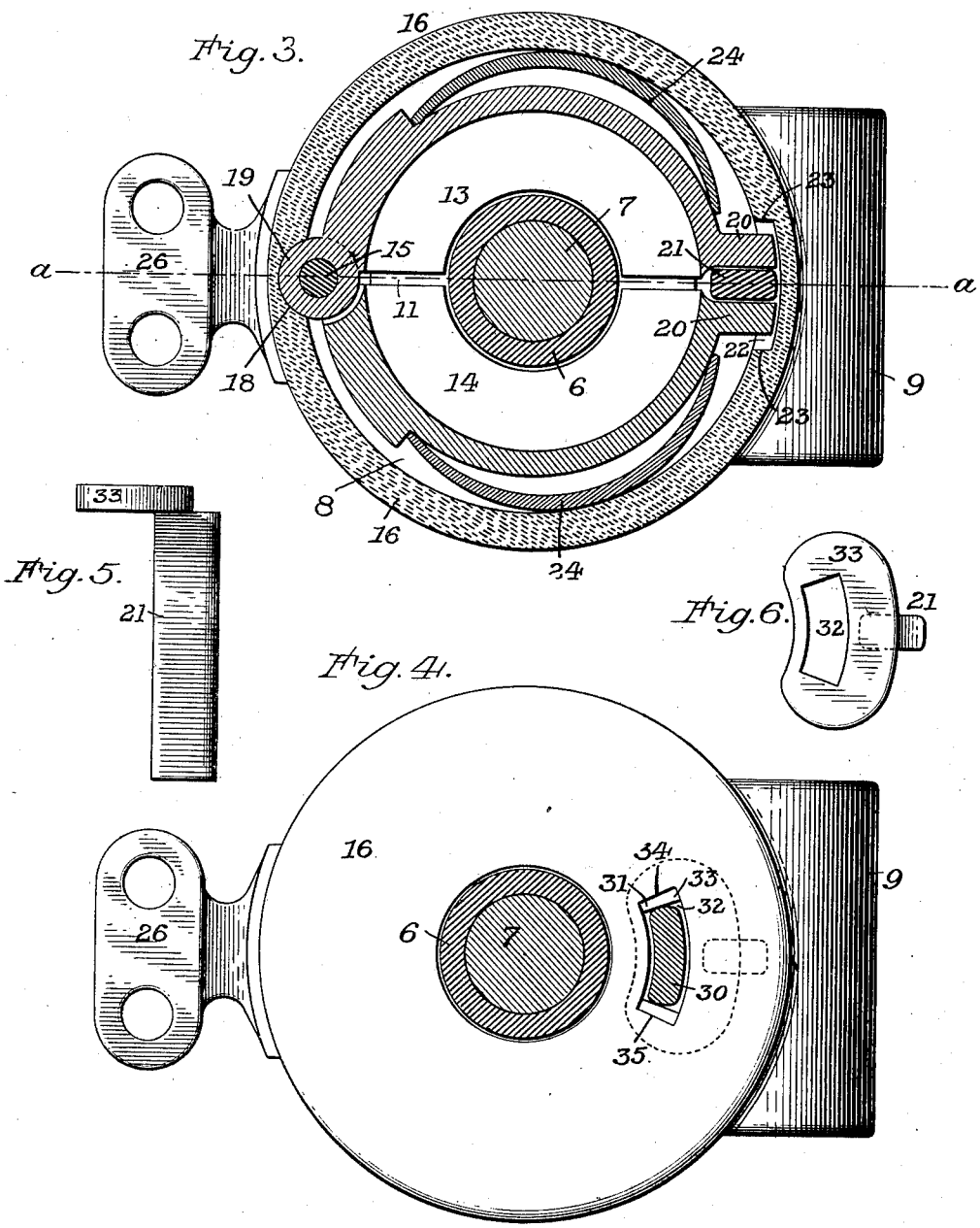

UNITED STATES PATENT OFFICE.

CORNELIUS S. VAN WAGONER, OF CLEVELAND, OHIO, ASSIGNOR TO M. L. VAN WAGONER, OF BROOKLYN, NEW YORK.

LOCKING DEVICE FOR VEHICLE STEERING MECHANISM.

SPECIFICATION forming part of Letters Patent No. 707,464, dated August 19, 1902.

Application filed September 6, 1901. Serial No. 74,533. (No model.)

*To all whom it may concern:*

Be it known that I, CORNELIUS S. VAN WAGONER, a citizen of the United States, residing at Cleveland, in the county of Cuyahoga and State of Ohio, have invented new and useful Improvements in Locking Devices for Vehicle Steering Mechanism, of which the following is a specification.

My invention relates to devices which automatically act to hold the steering wheel or wheels of motor or other vehicles to their intended position of adjustment; and its objects are a simple, effective, and compact structure and one which will operate positively and instantly to lock the wheels to their adjusted position the moment pressure is removed from the steering-handle and be readily and easily released thereby for varying the position of the wheels, and one in which all liability of the locking members becoming wedged together and preventing ready release is wholly eliminated.

In most of the prior devices for locking steering-wheels against accidental displacement clutches are employed which act only when the wheels meet with some obstruction which would ordinarily swerve the vehicle out of its course—such, for instance, as the well-known ball-clutch, in which the members are locked by balls or rollers interposed between converging surfaces. With such constructions the greater the tendency of the wheels to veer to the right or left the stronger will be the hold of the clutch and the greater will be the power required to release the same if at the particular moment it should become necessary to shift the position of the wheels in the direction in which they are being forced by the obstruction or depression encountered, and it will be readily seen that where the clutch is of the "wedge" variety it is liable to become so tightly locked by a sudden torsional strain on the wheels as to require greater force for its release than can ordinarily be applied to a steering-handle without liability of bending or breaking the handle or its connecting mechanism. The advantages, therefore, of a locking device which shall in no manner depend for its action upon a torsional strain on the wheels will be readily apparent. This feature of my invention, broadly stated, consists in the employment of a friction-clutch consisting of a movable and a fixed member, the latter being rigidly secured to the frame or body of the vehicle and the movable member being connected to the steering-wheels and acting on the fixed member to normally hold the wheels against steering movement. Connection is made between the movable member and a steering-handle, whereby a movement of the latter will release the clutch and change the position of the wheels, as will be hereinafter described.

After a detail description of a device embodying my invention the features deemed novel will be specified in the claims hereunto annexed.

Referring to the drawings, Figure 1 is a plan view of a steering-axle with my improved locking device applied thereto. Fig. 2 is a central vertical section of the device on line *a a* of Fig. 3. Fig. 3 is a horizontal section on line *b b* of Fig. 2. Fig. 4 is a horizontal section on line *c c* of Fig. 2; and Figs. 5 and 6 are side and top views, respectively, of the rocking lever for releasing the friction-clutch.

In Fig. 1 I have illustrated my invention as applied to a steering-axle, such as is most commonly used in motor-vehicles, the steering-wheels (not shown) being mounted on stub-axles 1 1, pivoted to a fixed axle 2 and provided with arms 3 3, which are moved by links 4 4 for steering the vehicle, as will be readily understood. Links 4 4 are shown as connected directly to the locking device; but it is to be understood that said device may be located on the body of the vehicle instead of on the fixed axle 2 and that connections may be made therefrom to the links 4 4 or arms 3 3 by levers or other suitable connections without departure from my invention.

My locking device embodies a friction-clutch, one member of which is rigidly secured to the shaft 2 or, if preferred, to some other convenient part of the frame or body of the vehicle. The other or movable member of the clutch forms the medium through which motion from the steering-handle 5 is imparted to the wheels, and it is therefore connected both to the steering-handle and to the wheels, and its action is to grasp the fixed member and normally hold the wheels against steering movement. The fixed clutch member 6 (best shown in Fig. 2) is made in the form of a hollow post, in which is journaled a shaft 7, said post being preferably cast integral with a bracket 8, having a sleeve 9, by means of which it is secured to the fixed axle 2. The face of this member is grooved, as at 10, to form annular wedge-shaped projections 11, which enter corresponding grooves 12 in the face of the movable or rotatable member, the object being to increase the frictional contact and effect a wedging action between the clutch members, and thus secure a firmer hold than would be possible with plane or smooth surfaces. The movable or rotatable clutch member surrounds the fixed member, and it is made in two sections 13 and 14, hinged together, as at 15, and inclosed within an annular case or cover 16, said case being supported on an annular bearing 17, formed around the edge of the bracket 8, and also by the upper end of the fixed clutch member 6, which projects through the top of the case, as clearly shown. The interior wall of case 16 is provided with a groove 18 to afford a seat for the knuckle 19 of the hinged clutch-sections 13 and 14, the hinged sections and the inclosing case being thus coupled to move or rotate together. The free ends of the clutch-sections 13 and 14 are provided with projections or lugs 20, between which is inserted a flat bar or rocking lever 21, which when turned on its longitudinal axis will thrust the clutch-sections apart and release them from engagement with the fixed member 6, as will be readily understood. The projections 20 extend into a recess 22 in the wall of the case 16, so that when the clutch members are separated by the rocking lever 21 lugs 20 will engage or come in contact with the edges 23 of the recess 22, and thus afford an additional lock between the clutch-sections 13 and 14 and the case 16. The clutch-sections 13 and 14 are normally held in locking engagement with the fixed clutch member 6 by strong metal springs 24, inserted between the sections and the inclosing case, as clearly shown in Fig. 3. The movement necessary to release the clutch being very slight, springs 24 may be made sufficiently powerful to insure a positive locking action of the clutch members and at the same time permit of their ready separation by the steering-handle, as will be presently explained. The entire clutch is completely housed within the cover or case 16, which is held in place by nuts 25, screwed on the projecting end of the clutch member 6. On the outside of said case and secured thereto is a lug 26, to which the links 4 4 are attached, as shown in Fig. 1. Shaft 7, which is journaled in the fixed clutch member, is provided with a cap 27, which fits over the nuts 25, and between said cap and the upper edge of the fixed clutch member are placed antifriction rollers or balls 28, which permit said shaft to turn easily and freely. These parts are held together by nuts 29, screwed to the shaft at the under side of the bracket 8, as shown in Fig. 2. Depending from the cap 27 is a lug or finger 30, which projects through a slot 31 in the top of the case and enters a slot 32 in the projecting head 33 of the rocking lever 21, said head being so arranged that a rotation of shaft 7 will cause finger 30 to turn or rock lever 21 for opening the clutch-sections 13 and 14, as will be readily understood. On referring to Fig. 4 it will be seen that slot 32 in the head of the rocking lever is just large enough to receive the finger 30 and permit the lever to be rocked thereby, while slot 31 in the top of the case 16 is wider than the finger, and that the clutch-sections will therefore be opened before finger 30 engages the end 34 or 35 of the slot 31, according to the direction of rotation of shaft 7. All of slot 31 which is occupied by the finger 30 is covered by the cap 27, and attention is called to the fact that the case or cover 16 is absolutely closed at all other points, so that dirt and dust are practically excluded from the interior parts.

The steering-handle 5 is connected to shaft 7, either directly, as shown, or when it is desired to locate it at a point removed from the axes of the shaft it may be connected thereto by a link and levers in a well-known manner.

The operation of the device is as follows: Handle 5 is turned to the right or left for rotating shaft 7, according to the direction in which the vehicle is to be steered. The initial movement of shaft 7 causes finger 30 to turn the rocking lever 21 for separating the clutch-sections and releasing them from locking engagement with the fixed clutch member 6. Finger 30 thereafter comes in contact with the end 34 or 35 of the slot 31, according to the direction of rotation, and case 16 is moved thereby for changing the position of the steering-wheels through the links 4 4 and arms 3 3, as will be readily understood. The moment pressure is removed from the steering-handle the clutch-sections are forced by their springs 24 into locking engagement with the fixed clutch member for holding the wheels to their adjusted position.

Having thus described my invention, what I claim as new, and desire to secure by Letters Patent, is—

1. In a locking device for vehicle steering mechanism the combination of a friction-clutch comprising a non-rotatable member adapted to be secured to the frame or body of a vehicle, and a rotatable member surrounding said non-rotatable member and adapted to be secured to a vehicle steering mechanism, means for normally maintaining said members in frictional engagement, and means for releasing such engagement and imparting rotary motion to said rotatable member for moving said steering mechanism, substantially as described.

2. In a locking device for vehicle steering mechanism, the combination of a friction-clutch comprising a fixed member adapted to be secured to the frame or body of a vehicle, a rotatable member surrounding said fixed member and adapted to normally grasp the same, means for connecting said rotatable member to the vehicle steering mechanism, and means for releasing it from and rotating it around said fixed member, substantially as described.

3. In a locking device for vehicle steering mechanism, the combination of a clutch, means for connecting the fixed member thereof to the frame or body of a vehicle, a rotatable case inclosing said clutch, means for connecting said case to a vehicle steering mechanism, suitable connections between said clutch and case for normally holding the latter against rotation, and means for releasing said clutch and rotating said case, substantially as described.

4. In a locking device for vehicle steering mechanism, the combination of a fixed clutch member, means for rigidly securing said member to the frame or body of a vehicle, a rotatable clutch member surrounding said fixed member and adapted to normally grasp the same, means for connecting said rotatable member to a vehicle steering mechanism, a rotatable shaft, and suitable connections from said shaft to said rotatable clutch member whereby the latter will be released from and rotated around said fixed member by the rotation of said shaft, substantially as described.

5. In a locking device for vehicle steering mechanism, the combination of a cylindrical clutch member, means for rigidly securing said member to the frame or body of a vehicle, hinged clutch-sections surrounding said fixed member and adapted to normally grasp the same, means for connecting said clutch-sections to a vehicle steering mechanism, and means for separating said sections and rotating them around said fixed member, substantially as described.

6. In a locking device for vehicle steering mechanism, the combination of a cylindrical clutch member, annular wedge-shaped projections thereon, means for rigidly securing said member to the frame or body of a vehicle, hinged clutch-sections surrounding said fixed member and adapted to frictionally engage the same, said sections being provided with grooves for receiving the annular projections on the fixed clutch member, means for connecting said sections to a vehicle steering mechanism, and means for separating said sections and rotating them around the fixed clutch member, substantially as described.

7. In a locking device for vehicle steering mechanism, the combination of a cylindrical clutch member, means for rigidly securing said member to the frame or body of a vehicle, hinged clutch-sections surrounding said fixed clutch member, means for connecting said sections to a vehicle steering mechanism, a shaft journaled in said fixed member, and connections from said shaft to said hinged sections whereby the latter will be moved from and rotated around said fixed member by the rotation of said shaft, substantially as described.

8. In a locking device for vehicle steering mechanism, the combination of a cylindrical clutch member, means for rigidly securing said member to the frame or body of a vehicle, clutch-sections surrounding said fixed member and adapted to normally grasp the same, a rotatable case inclosing said sections and connected thereto, means for connecting said case to a vehicle steering mechanism, and means for separating and rotating said sections, substantially as described.

9. In a locking device for vehicle steering mechanism, the combination of a cylindrical clutch member, means for rigidly securing said member to the frame or body of a vehicle, hinged clutch-sections surrounding said fixed member and adapted to normally grasp the same, a rocking lever between said sections for separating the same, a rotatable case inclosing said sections and coupled thereto, means for connecting said case to a vehicle steering mechanism, a shaft journaled in said fixed clutch member, and a projection therefrom for moving said rocking lever and thereafter rotating said case, substantially as described.

In testimony whereof I have hereunto set my hand in presence of two subscribing witnesses.

CORNELIUS S. VAN WAGONER.

Witnesses:
WM. M. MONROE,
GEO. O. WILLET.